United States Patent [19]
Thompson et al.

[11] Patent Number: 5,768,128
[45] Date of Patent: Jun. 16, 1998

[54] SYSTEM FOR DETERMINING FERTILIZER BLEND AND APPLICATION RATE METHOD AND APPARATUS FOR DETERMINING OPTIMUM FERTILIZER BLENDS, BASED ON A PLURALITY OF FACTORS, TO MATCH FIELD NUTRIENT REQUIREMENTS

[75] Inventors: Wayne Thompson, St. Paul; Donald E. McGrath, Willmar, both of Minn.

[73] Assignee: IBOCO, Inc., Benson, Minn.

[21] Appl. No.: 529,406

[22] Filed: Sep. 18, 1995

[51] Int. Cl.$^6$ .................................................. G06F 19/00
[52] U.S. Cl. ................................................................ 364/420
[58] Field of Search ............................................... 364/420

[56] References Cited

U.S. PATENT DOCUMENTS 4,015,366  4/1977  Hall, III ................................. 47/1.01
5,220,876  6/1993  Monson et al. ........................ 111/130
5,355,815  10/1994  Monson .................................. 111/200
5,394,959  3/1995  Wright et al. ........................... 175/20

*Primary Examiner*—Donald E. McElheny, Jr.
*Attorney, Agent, or Firm*—Westman, Champlin & Kelly, P.A.

[57] ABSTRACT

A system is used for applying fertilizer to a field. A nutrient requirement map is first obtained for the field indicating nutrient requirements for a plurality of locations in the field. A first blend of fertilizer is calculated based on the nutrient requirements. Fertilizer components are blended to form the first blend. The first blend is loaded into a first bin of an applicator. The first blend is then applied with the applicator at a first application rate, wherein the first application rate varies as the applicator travels across the field based on nutrient requirements corresponding to the location over which the applicator is then traveling.

29 Claims, 13 Drawing Sheets

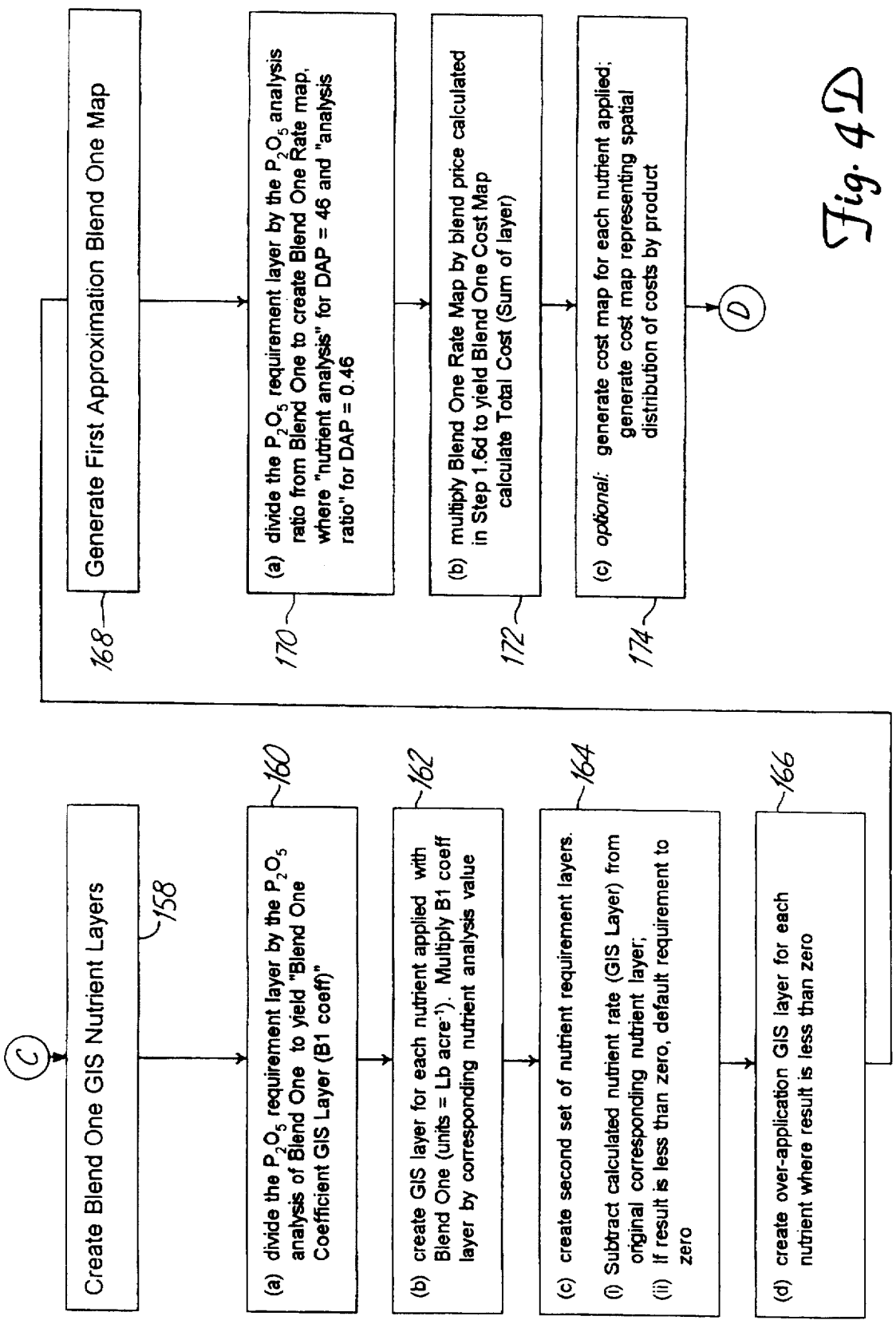

SYSTEM FOR DETERMINING FERTILIZER BLEND AND APPLICATION RATE METHOD AND APPARATUS FOR DETERMINING OPTIMUM FERTILIZER BLENDS, BASED ON A PLURALITY OF FACTORS, TO MATCH FIELD NUTRIENT REQUIREMENTS

REFERENCE TO CO-PENDING APPLICATIONS

Reference is made to the following co-pending applications, hereby incorporated by reference:

Ser. No. 08/286,768 filed Aug. 5, 1994, U.S. Pat. No. 5,526,705 entitled AUTOMATED WORK STATION FOR ANALYZING SOIL SAMPLES, and assigned to the same assignee as the present invention;

Ser. No. 08/286,769 filed Aug. 5, 1994, abandoned entitled SOIL SAMPLER FOR ANALYSIS FOR FERTILIZER DETERMINATION, and assigned to the same assignee as the present invention; and U.S. patent application Ser. No. 08/413,859, U.S. Pat. No. 5,668,719, entitled METHOD OF FERTILIZER APPLICATION AND FIELD TREATMENT, and assigned to the same assignee as the present invention.

BACKGROUND OF THE INVENTION

The present invention deals with a system for treating a field of interest. More particularly, the present invention is directed to a system which determines an appropriate fertilizer blend and an application rate for applying the blend to the field of interest.

All soils consist of three physical phases: gaseous, liquid and solid. The gaseous phase is similar in content to the atmosphere with differences resulting from interactions of the soil chemical, physical and biological characters. The soil gaseous phase often contains higher concentrations of volatile compounds evolved through chemical and microbial decomposition of organic materials, and carbon dioxide ($CO_2$) which is evolved during respiration of plant roots and soil fauna. The liquid phase usually consists of dissolved minerals and nutrients, and dissolved organic acids. Dissolved nutrients are usually considered the most readily available form for plant uptake and use; the solid phase is further subdivided into two fractions: organic materials and inorganic minerals. The organic fraction consists of decomposed and decomposing plant materials, primarily plant roots and the dead microbes and micro-fauna associated with the plant root system. The inorganic mineral fraction is further subdivided into soil separates, three particle size fractions: clay (less than 0.002 mm), silt (0.002–0.60 mm) and sand (0.50–2.0 mm). Particles larger than 2.0 mm, such as stones, are not considered in soil textural classing.

Soils can be classified by textural class using a textural triangle and by soil family categories of Soil Taxonomy according to the relative distribution of soil separates. One of twelve textural class names is assigned to a soil according to the relative distribution of the three separates as illustrated in a triangular diagram accepted and used by the U.S. Soil Survey Staff. The distribution of sand, silt and clay in a soil by weight or mass is used to classify soils according to one of soil family from Soil Taxonomy (very fine clayey, fine clayey, fine loamy, fine silty, coarse silty, coarse loamy, and sandy).

There are also other components such as iron and aluminum hydroxides (sesquioxides), calcium and magnesium carbonates, powder sand (particles having a size of 10–100 micrometers) as well as soil acidity (pH) that can be used when differentiating soil.

Soil classification considers differences in soil chemical, physical and biological characteristics throughout the soil profile, e.g., the changes in soil color and texture with increasing depth. These changes and differences are influenced by five soil forming factors: climate, parent material, topography, vegetation, and time. These parameters are used to classify different soils.

Each field for growing crops typically contains soils having several different characteristics. Each soil may require different specific fertilizer for optimum production, based on many different factors such as drainage, topography, exposure to the sun, nutrient content and many others. It is common for each field to contain various soils so that there are different fertilizer requirements in different areas of the field to obtain optimum production.

A farmer attempts to obtain data about a field of interest in order to arrive at some determination as to the nature of soil in the field. On the basis of the data obtained with respect to these nutrients and micronutrients, an attempt is made to determine what nutrients must be added to the soil to obtain optimal performance in the field.

The most common practice used today in fertilizer application is to fertilize the whole field according to the demand of the poorest soils or according to the demand of average soils. Use of this technique leads to many field areas receiving more or less fertilizer than optimum. This, in turn, leads to potential crop yield suppression, both excess and deficient applications of fertilizers over different field areas, and diminished economic gain through inefficient fertilizer management.

One conventional practice used in treating a field of interest is to provide different fertilizer components to different bins in a fertilizer applicator. As the applicator is moved across the field, different components are drawn from the different bins, at various locations, based on a perceived need for the particular fertilizer components in any given bin.

This system has significant disadvantages. For example, in such applicators, bins may all be of uniform sizes. Therefore, if one fertilizer component is required far more than other fertilizer components, that particular bin needs to be reloaded many times during the application process. This reduces the efficiency of the application process.

In addition, it is cumbersome for the operator of the applicator to carry each fertilizer component, independently, to the field and to the applicator. This also renders the process quite inefficient.

SUMMARY OF THE INVENTION

A system is used for applying fertilizer to a field. Nutrient requirement maps are first obtained for the field indicating nutrient requirements for a plurality of locations in the field. A blend of fertilizer is calculated based on the nutrient requirements. Fertilizer products are blended to form the first blend. The first blend is loaded into a first bin of an applicator. The first blend is then applied with the applicator at a first application rate, wherein the first application rate varies as the applicator travels across the field based on nutrient requirements corresponding to the location over which the applicator is then traveling.

DETAILED DESCRIPTION OF THE PREFERRED EMBODIMENTS

In order to determine a fertilizer blend which can be applied to a field of interest, one must first determine the nutrient requirements for the field of interest. This can be done in a number of ways. In one preferred embodiment of the present invention, maps or grids can be purchased or developed which reflect the particular nutrient requirements for specific locations in the field of interest. However, in accordance with another preferred embodiment of the present invention, soil samples are taken from the field of interest and are analyzed in order to develop a nutrient requirements map. This map is used in blending the fertilizer to be applied to the field of interest.

Figure 1:
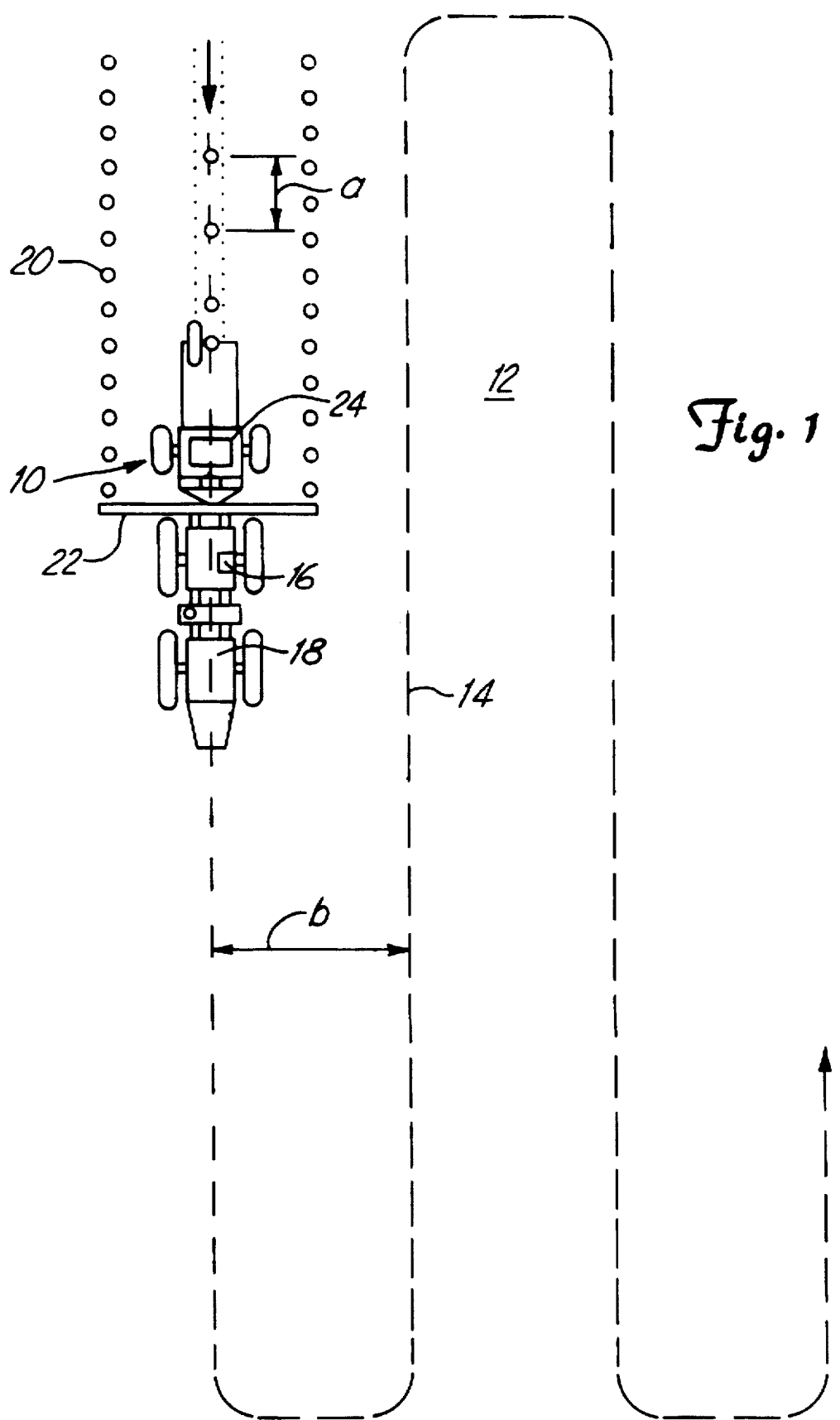
FIG. 1 is a schematic representation of a soil sampling system used to establish a grid pattern.

FIG. 1 schematically illustrates an automatic soil sampler 10 moving over field 12 in a back and forth motion defining a pattern 14 which is also followed by a fertilizer spreader or applicator. Soil sampler 10 accumulates a series of soil samples at selected spacing (e.g., 10–15 meters) along path 14 to provide samples across field 12 in a grid. Data reflecting the grid spacing and sampling depth are entered into a memory that also provides an x–y location of each sample taken for identification. The sample depth can be preset by suitable adjustments prior to sampling.

The grid spacing is determined by the parameters "a" and "b". "a" is the distance between adjacent samples and "b" is the coverage width of a fertilizer spreader, again perhaps 10–15 meters.

To determine a grid spacing for the map, a marker with a distance sensor or other navigation means may be used in a known manner. Global positioning system (GPS) navigation permits accurate x–y coordinates. Also, an odometer 16 on a towed vehicle 18 can give the "y" distance from a start signal that can, in turn, be given by an operator at the start of each pass down field 12 from each end of field 12. The "x" distance shown by "b" may be established by foam markers 20 which are also correlated to a start position in field 12 and give the lateral offset of each pass of sampler 10. In the preferred embodiment, towed vehicle 18 has a boom 22 used for dropping foam markers 20.

Soil sampler 10 is described in greater detail in U.S. patent application Ser. No. 08/413,859 filed on Mar. 28, 1995 and hereby incorporated by reference. Briefly, however, sampler 10 includes an attachable trailer 24 which has a sampling probe assembly that pulls a soil sample from the soil and packages the soil sample between two sheets of plastic material. The plastic material is heat sealed into individual packages which are then loaded into trailer 24 for storage until they are sampled.

Figure 2:
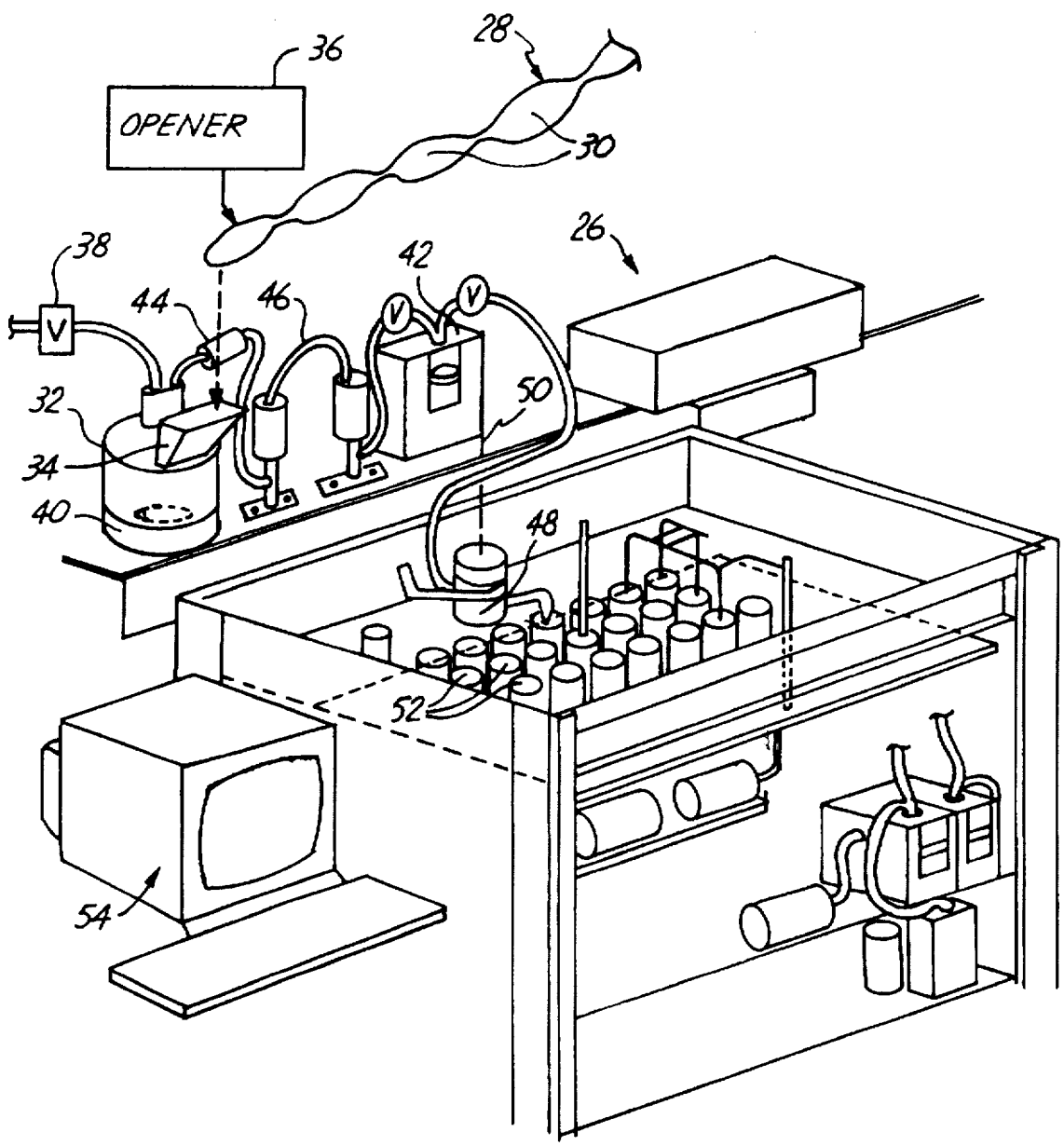
FIG. 2 is a perspective view of one embodiment of an automated work station used in accordance with the present invention.

FIG. 2 shows a perspective view of one embodiment of a portion of an automated work station according to the present invention. FIG. 2 more specifically illustrates a sample preparation station 26. In the preferred embodiment, a web 28 of packages includes a plurality of distinctly sealed package elements 30, each containing a soil sample from a portion of field 12. However, the package elements 30 are connected to one another and are provided to station 26 by suitable means, such as a continuous conveyor. As package elements 30 approach mixing chamber 32, they are moved adjacent a chute 34 and are opened by apparatus 36. Chute 34 guides the soil from package elements 30 into mixing chamber 32. Apparatus 36, is preferably an automated knife or serrated roller, or another suitable element for opening package elements 30. Water is introduced through a valve 38 into mixing chamber 32 and a slurry is formed through agitation by a stirrer 40.

Syringe doser 42 draws the slurry through filter 44 into humidity meter 46 and provides it to rotatable dispensing nozzle 48 which is mounted for rotation about axis 50. Nozzle 48 provides a known amount of slurry into one of a number of vessels 52. Vessels 52 are driven by, for example, a continuous conveyor through an analyzing line where various samples are prepared, and measurements are taken. The measurements are analyzed by computer 54, and the results of the analysis are used in preparing a nutrient requirements map for the field of interest. Computer 54 uses the fertilizer requirements information to determine an optimal, or desired, fertilizer blend for field 12.

The operation of work station 26 is described in greater detail in U.S. patent application Ser. No. 08/286,768 entitled AUTOMATED WORK STATION FOR ANALYZING SOIL SAMPLES filed on Aug. 5, 1994, hereby incorporated by reference. Since package elements 30 all relate to a certain proximity or location in fields 12, the particular nutrient requirements for each of those locations in field 12 can be determined by automated work station 26. Once these nutrient requirements are known, the nutrient requirements map can be obtained. It should be noted that this is but one preferred embodiment of a technique used in obtaining the nutrient requirements maps.

Figure 3:
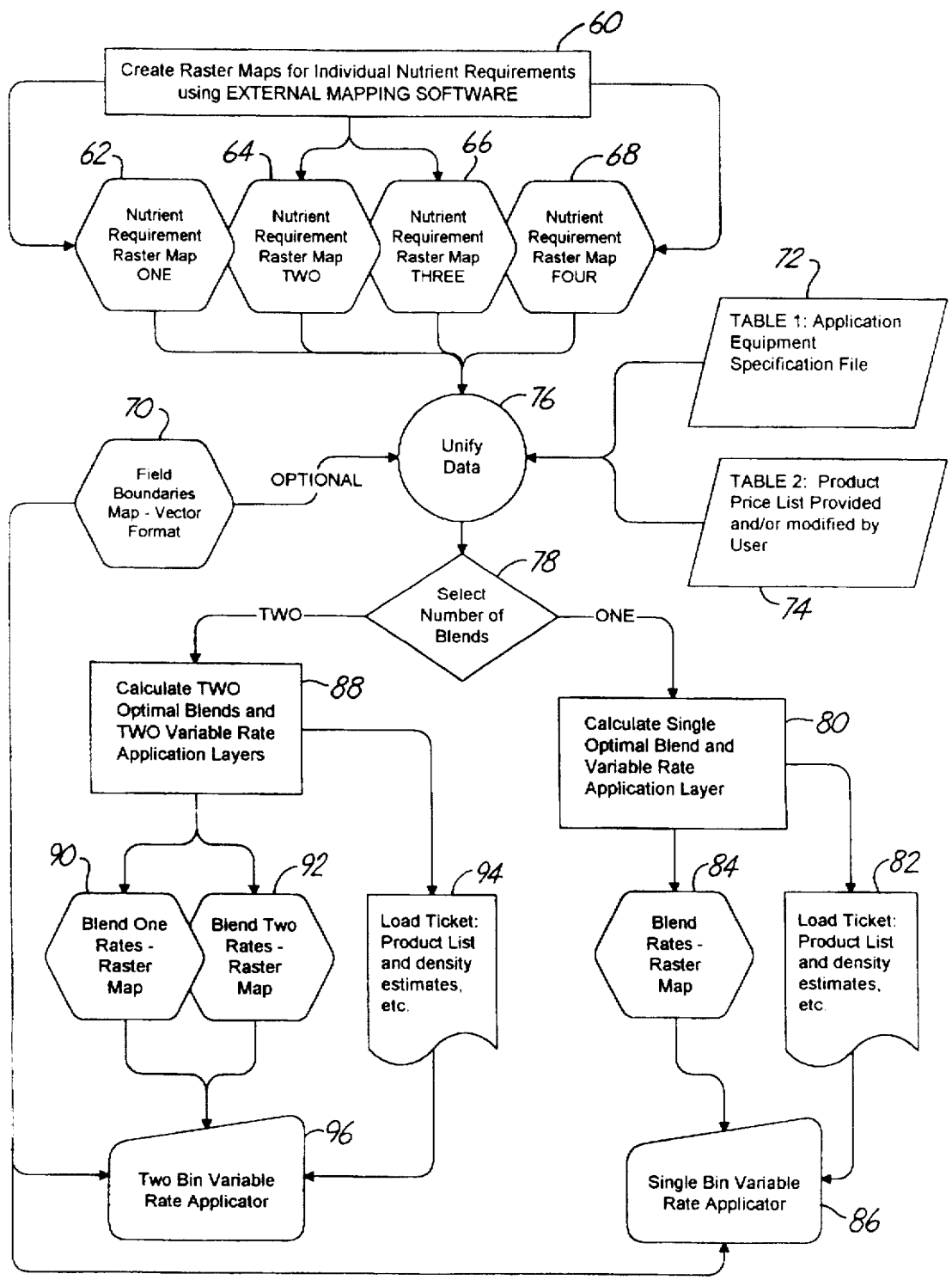
FIG. 3 is a flow diagram illustrating one preferred embodiment of the present invention.

FIG. 3 is a block diagram illustrating operation of a system which calculates optimal fertilizer blends for a field of interest according to the present invention.

In the embodiment in which computer 54 is determining the desired fertilizer blend, computer 54 must first be provided with maps which indicate individual nutrient requirements for field 12. This can either be accomplished using the soil sampler and work station 26 described above, or it can be accomplished using any other known and commercially available technique. Some techniques involve simply purchasing such a map or generating such a map in any known manner. In the preferred embodiment, the nutrient requirements map is in the form of a raster map which defines an array of cells, each cell having a position and a value. Each cell on the nutrient maps contains a value indicative of pounds per acre for the associated nutrient which is required for optimal blend. The cells preferably are capable of having multiple values so that each cell can have a value for each nutrient for which analysis is desired.

Also, in the preferred embodiment, the nutrient requirements map incorporates a vector map. Vector maps, for purposes of this description, include maps which are efficiently used to define highly precise boundaries. The system according to the present invention uses vector map components to define the boundaries of field 12, and uses raster map components to define the internal locations or positions of field 12. Obtaining the nutrient requirements map is indicated by block 60. A nutrient requirement raster map can also be provided for each nutrient of interest. This is indicated by blocks 62, 64, 66 and 68. In the embodiments in which vector map components are used, the field boundaries are input in vector format. This is indicated by block 70.

In addition to receiving the nutrient requirement maps, computer 54 also receives information indicative of the particular application equipment being used to apply the fertilizer blend, and a product list identifying certain characteristics of the fertilizer products, or fertilizer components to be used in forming the fertilizer blend. These items of information are taken from tables either stored internally in the memory of computer 54, or provided by user input to computer 54.

Examples of application equipment specification information include the particular model of the applicator, along with the number and size of bins on the applicator (typically 1–4 or so bins). The product list information typically includes a product analysis (i.e., the amount of different nutrients in each product), and the price per pound of each product, as well as any other information which the user may desire to input. These information inputs are indicated by blocks 72 and 74 in FIG. 3.

The equipment specification information may also include the bounds implemented in the machine for the rate of application. In other words, each machine may have a maximum application rate, and a minimum application rate, and that information is input to computer 54. After computer 54 has received all of this information, the user then selects whether only one blend is desired, or whether two blends are desired. In an embodiment in which only one blend is desired, the bins of the applicator are simply filled with the single blend which is determined by computer 54, and the applicator applies that blend to field 12. However, where two blends are required, two or more bins on the applicator are filled, one with the first blend, and one with the second, and the two blends are applied at a rates determined by computer 54. Where more than one blend is used, computer 54 also preferably indicates which bins are to be loaded with which blend based on bin size, blend volume, etc., in order to optimize the fit between bins and blends. In any case, the number of blends must be selected. This is indicated by blocks 76 and 78.

Computer 54 also accesses map header information. This information typically includes the number of rows and columns in the raster map, the values that correspond to null portions of the field (i.e., portions of the field which do not grow crops because of intermittent streams, tree clumps, or other areas which are non-farmable), and an alternate coordinate system so that the vector and raster maps can overlay one another properly.

In the embodiment in which one blend is to be applied, computer 54 calculates the single optimal (or desired) blend and also calculates an application rate at which the blend will be applied. In the preferred embodiment, the application rate is variable and can vary as the applicator moves along path 14 in field 12. The variation in the application rate depends on the particular nutrient requirements for each location (or for groups of locations) from field 12. This is indicated by block 80. The particular fertilizer blend calculated by computer 54 is provided to the user who can then use the information in purchasing the particular fertilizer components required for the blend. The blend may actually be made up by the seller of the fertilizer component products and provided, as a blend, to the user of the applicator. This is indicated by block 82. The application rate is provided in the form of a raster map which indicates a particular application rate for each location in field 12. This is indicated by block 84. The blend is then loaded into a bin in the applicator and is applied by the applicator at the rates determined by computer 54. This is indicated by block 86.

If, at block 78, the user indicates that two blends are to be calculated, then computer 54 calculates two desired blends, to be applied at first and second application rates. As with the one-blend embodiment, the application rates of both the first and second blend are variable according to the nutrient requirements at each location in field 12.

As will be described later in the specification in greater detail, the system according to the present invention first calculates one optimal blend based on a chosen nutrient. Then, in calculating the second optimal or desired blend, computer 54 not only takes into account the original nutrient requirement maps input to the system, but also takes into account the amount of nutrients which will be applied to fields 12 from the first blend at the first rate. Taking this information into account, computer 54 calculates a second desired blend, and a second application rate at which the second blend is to be applied to field 12. Computer 54 outputs the application rates for both blends as either a single raster map (with each cell having two variables), or as two independent raster maps. This is indicated by blocks 88, 90 and 92.

As with the single blend embodiment, where computer 54 calculates two blends, the fertilizer components, and the quantity of each fertilizer component, is output by computer 54. This information can then be taken to a fertilizer seller or dealer who utilizes this information to prepare the blend which is eventually to be loaded in the applicator. This is indicated by block 94.

After the blend is made up, the first blend is loaded into a first bin in the applicator, and the second blend is loaded into a second bin in the applicator. The applicator is then controlled to apply the first and second blends at the first and second application rates, respectively. This is indicated by block 96. It should be noted that computer 54 will also preferably output which blend is to be loaded into which bin. For instance, two-bin applicators may typically have a large bin and a small bin. Based on the application equipment specifications input to the computer 54, computer 54 indicates to the operator that the larger volume blend is to be loaded into the larger volume bin. In addition, blend optimization can also be reduced to accommodate bin volume. This results in a somewhat sub-optimum blend or blends, but increases efficiency because both bins are completely filled and the application rates are adjusted to minimize reloading operations. This same type of optimization can be performed for applicators using any reasonable number of bins.

Figure 4A:
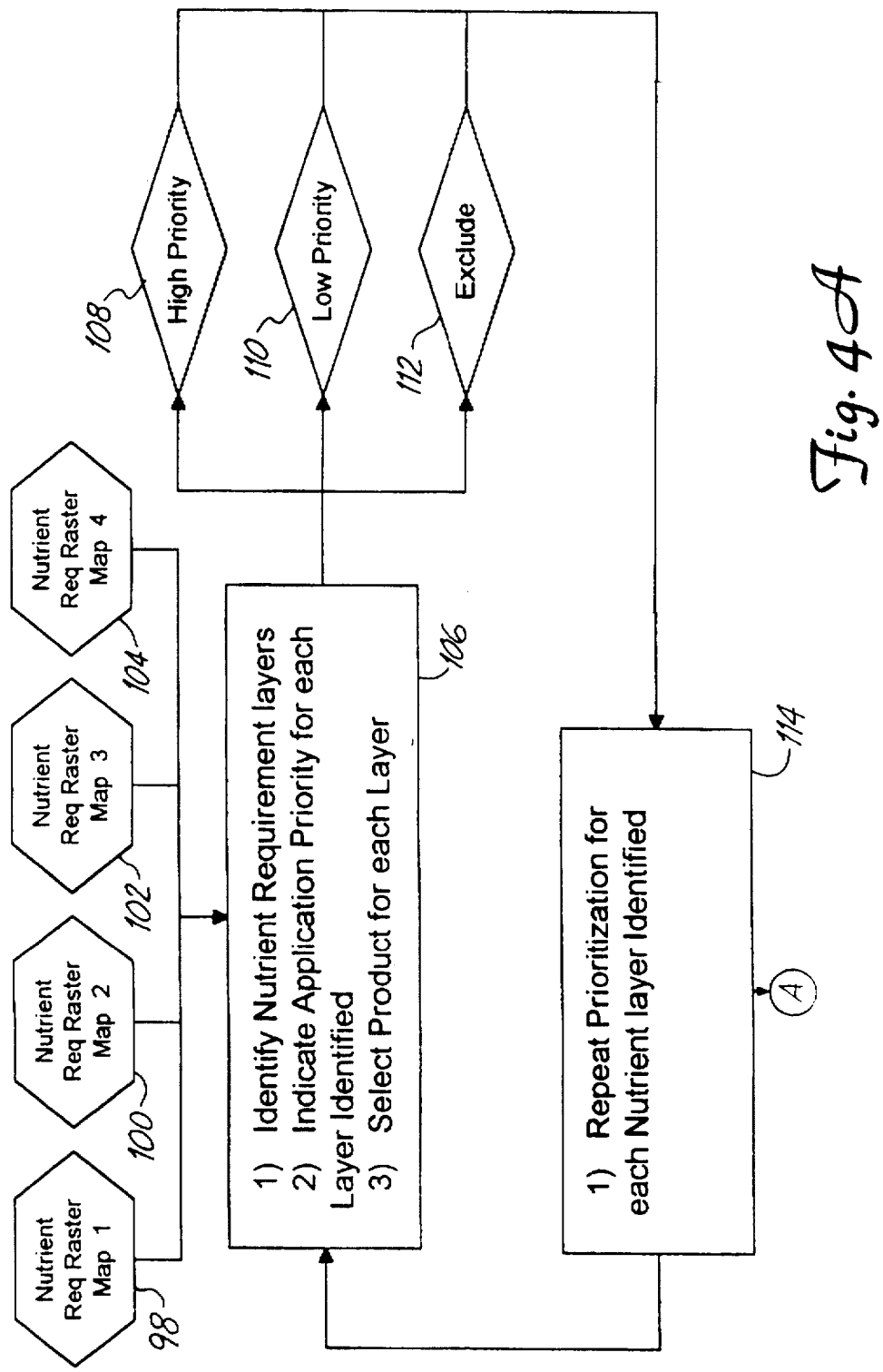
FIGS. 4A–4H are more detailed flow diagrams illustrating one embodiment of the present invention.
Figure 4B:
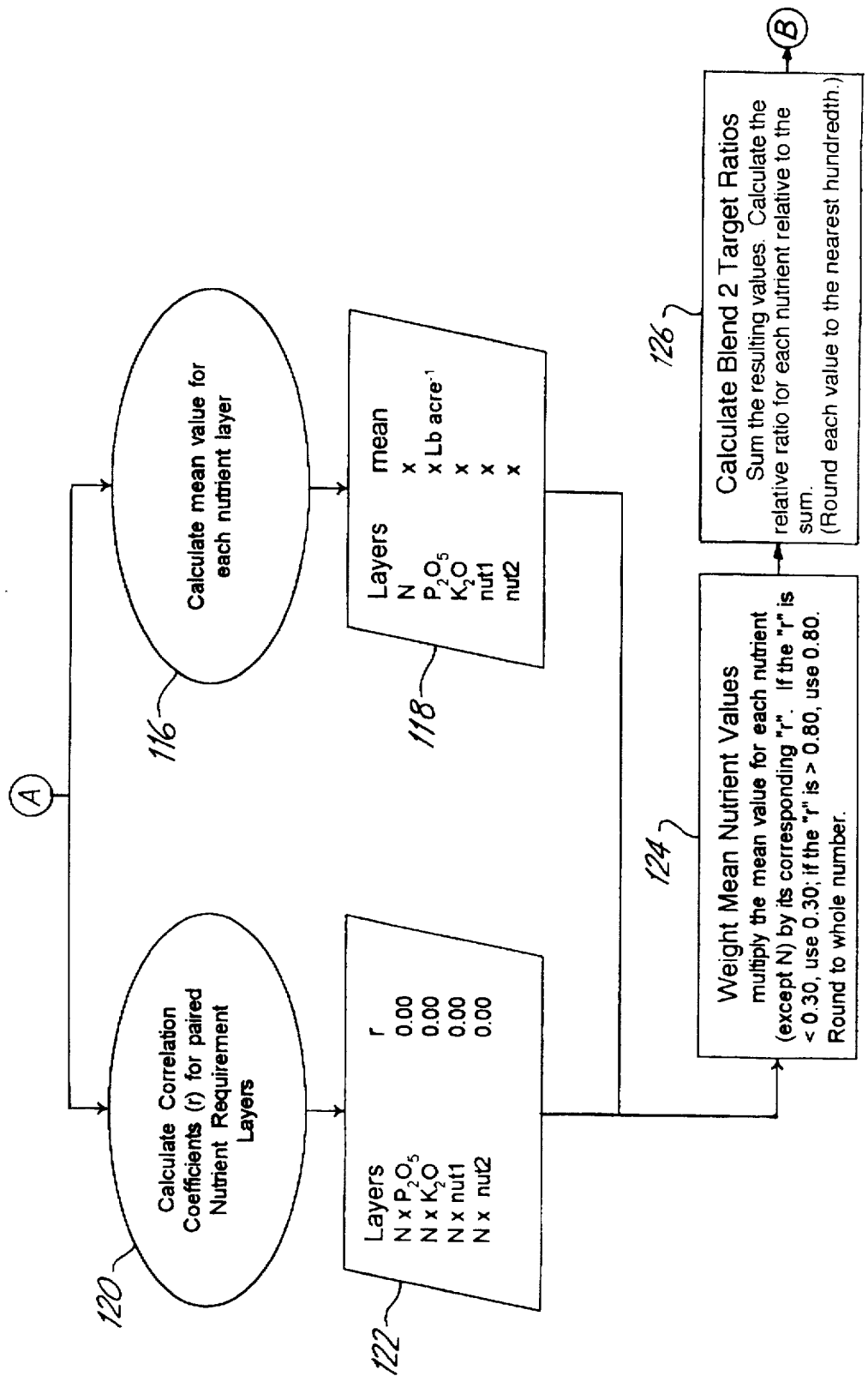
Figure 4C:
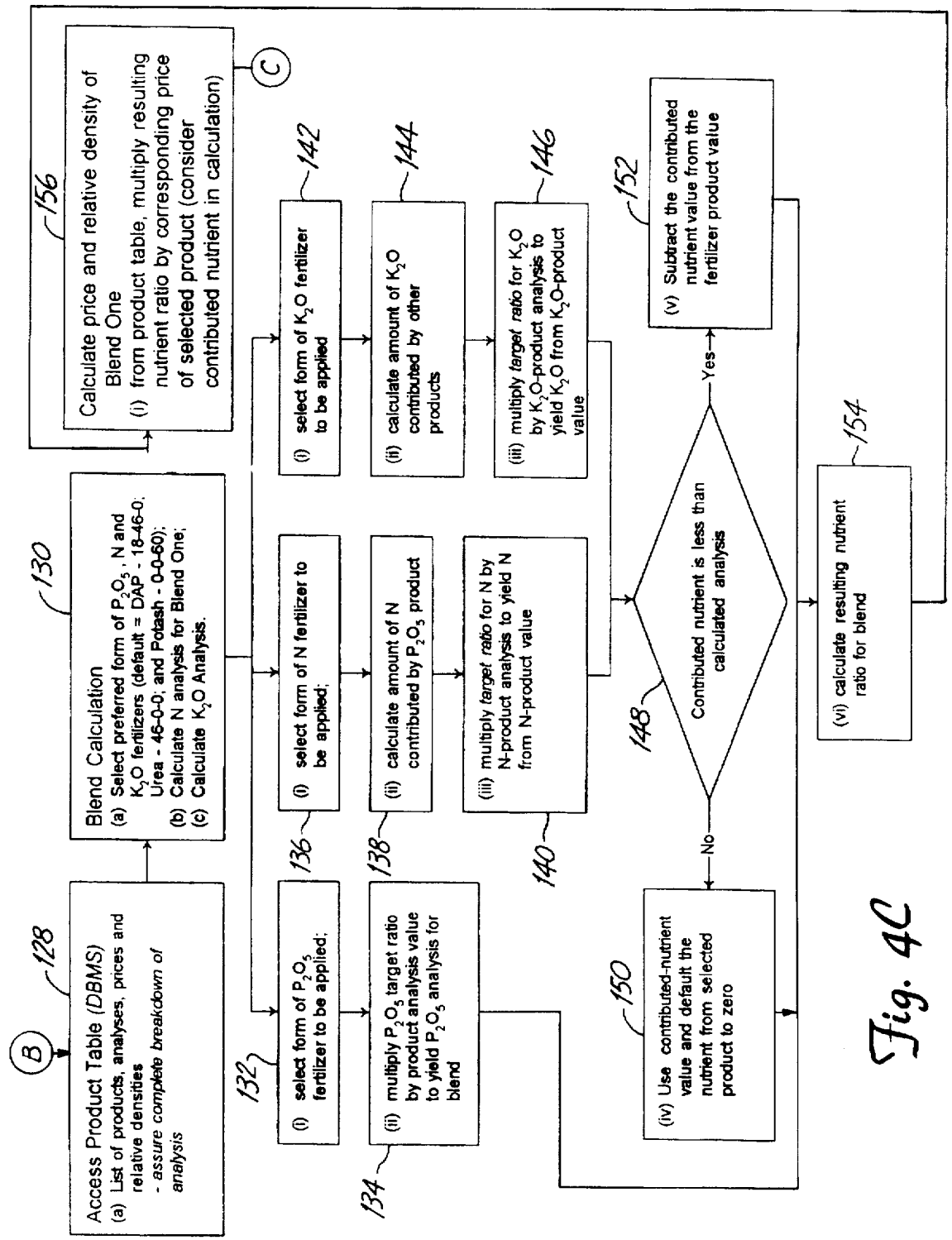
Figure 4E:
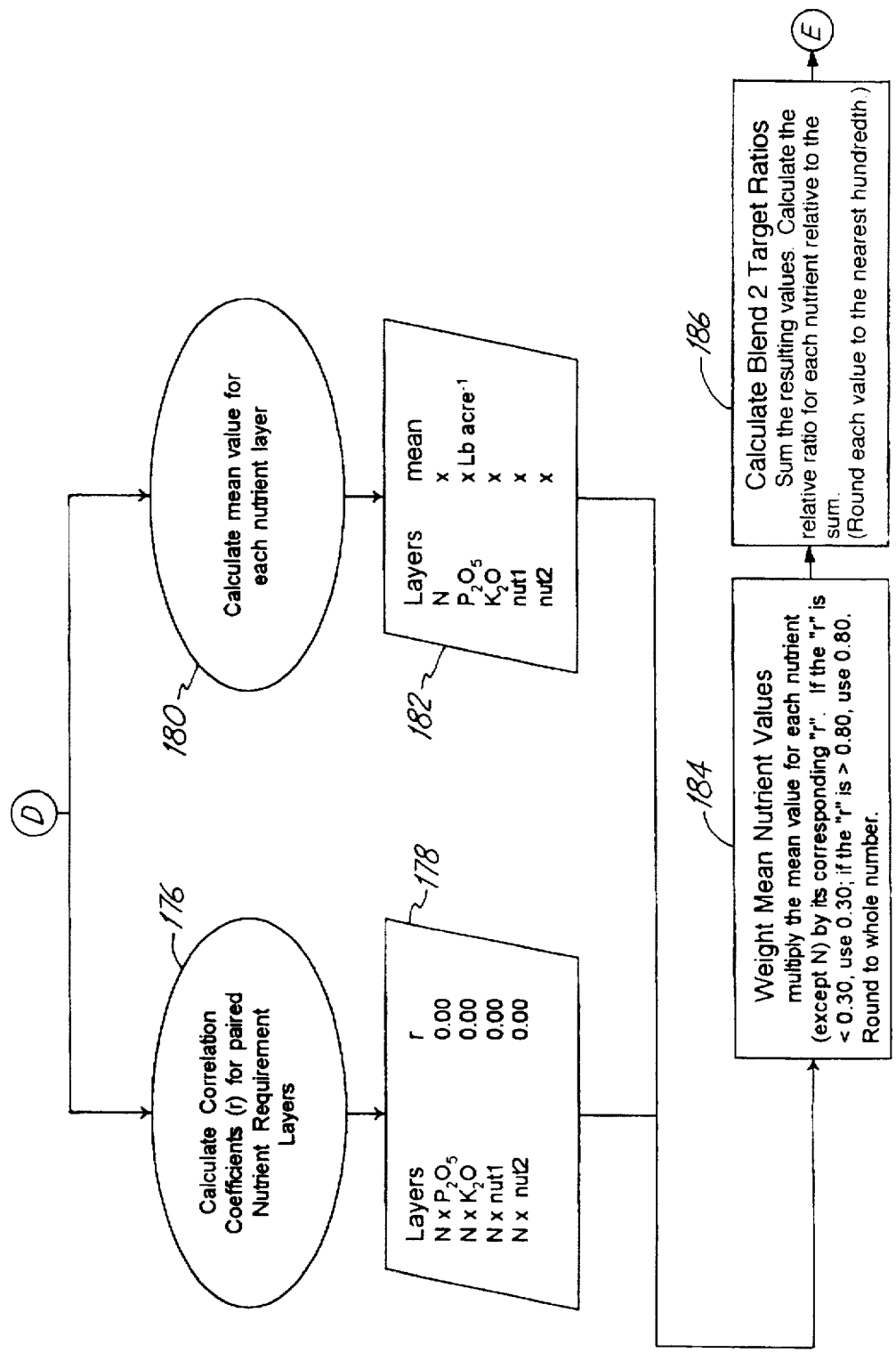
Figure 4J:
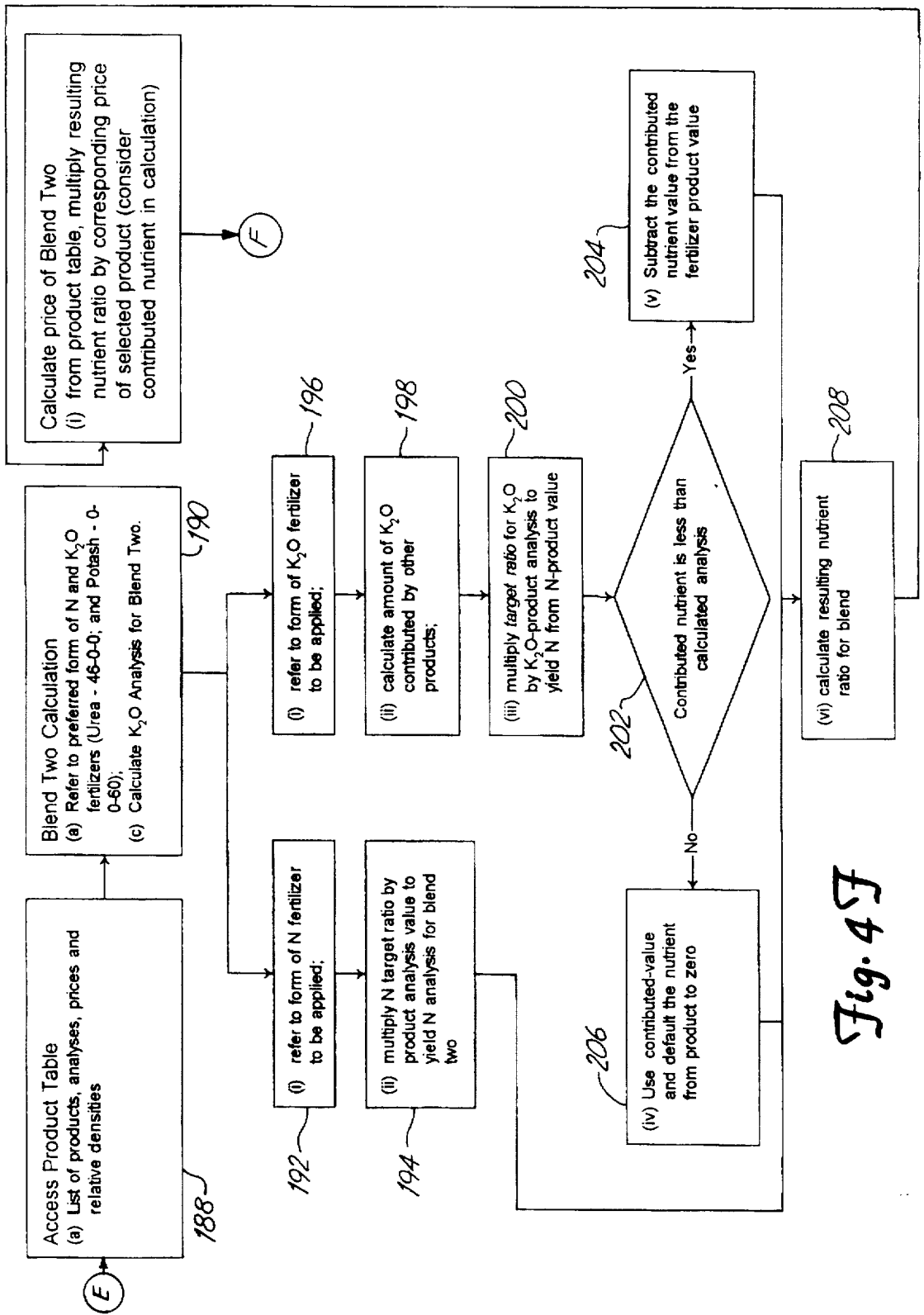
Figure 49:
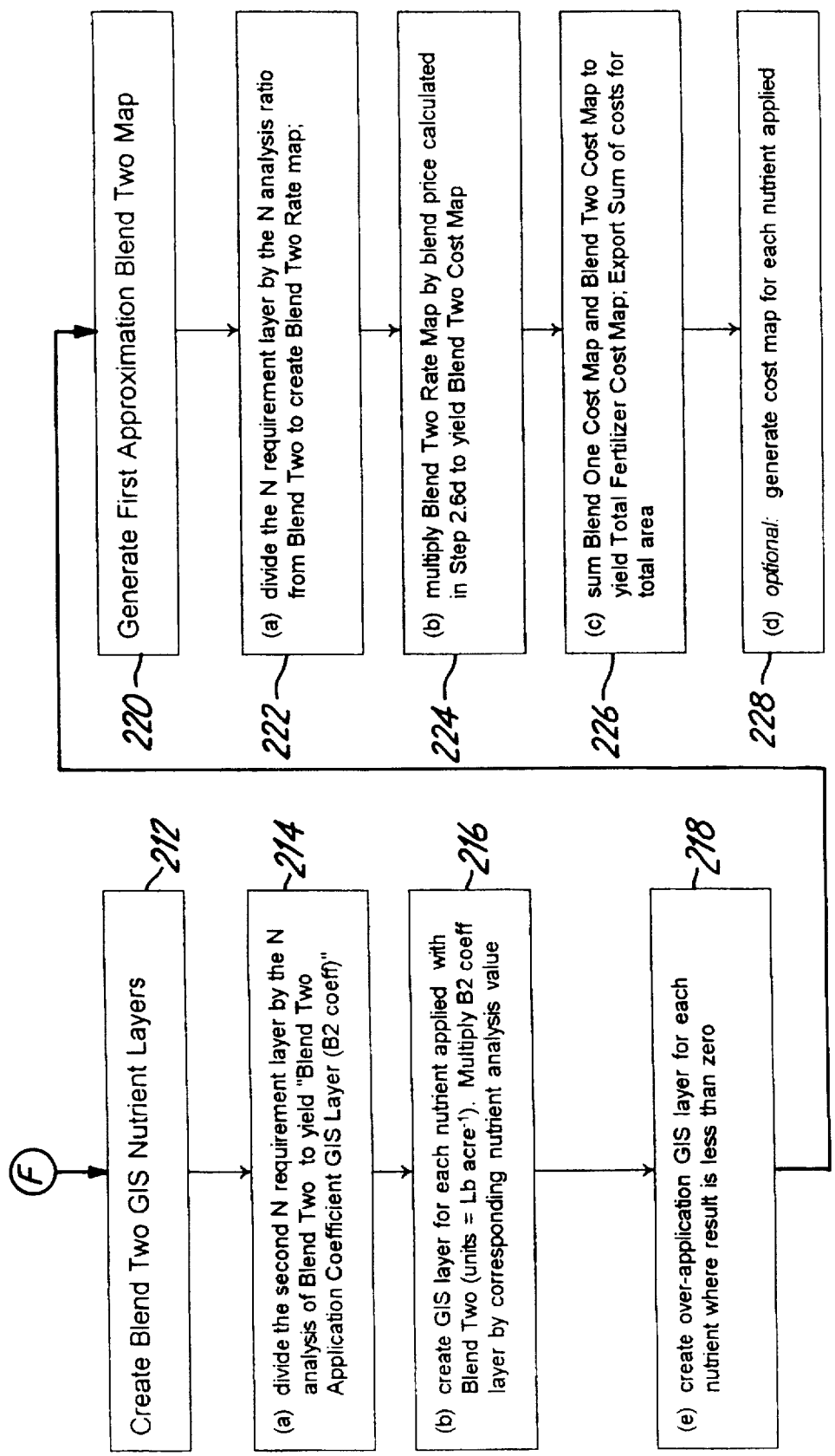

FIGS. 4A–4H collectively form a more detailed block diagram illustrating the calculation of optimal blends by computer 54. In calculating the optimal blends, computer 54 first accesses the nutrient requirement raster maps for each of the nutrients for which analysis is required. In FIG. 4A, four nutrient raster maps are input to computer 54, and this is indicated by blocks 98, 100, 102 and 104. Examples of nutrients for which raster maps may be provided are nitrogen (N), phosphorous ($P_2O_5$), potassium ($K_2O$), and zinc (Zn). In the embodiment shown in FIG. 4A, each raster map represents only one nutrient, and each map is properly geo-referenced using any appropriate reference system, such as GPS. In inputting this information, the user may also wish to identify upper and lower limits for each nutrient application. For example, the user may simply not wish to go over a certain number of pounds per acre for any given nutrient. In that instance, this information would be input to computer 54.

An application priority for each nutrient is then determined. In the preferred embodiment, if the user identifies the particular nutrient as having a high priority, both over applications and under applications of the particular nutrient will be minimized by computer 54 during the optimization process. If the user identifies the particular nutrient as being low priority, the application rate will be based upon the nutrient ratios for each blend and the accuracy of the application of the particular nutrient will be a function of its correlation with other nutrients having a high priority rating. In other words, the particular nutrient may be overapplied, or underapplied, if the high priority nutrients require such an application to closer meet the requirements of the higher priority nutrients.

With a two-blend system, two nutrients preferably have high priority ratings while the remaining are rated low priority or are excluded from the analysis. In the present example, N and $P_2O_5$ are assigned high priority and $K_2O$ is assigned a low priority and the remaining nutrients are excluded. If the user excludes the particular nutrient from the optimization analysis, this indicates that the nutrient requirement map will not be used in the optimization process by computer 54, and any application of the nutrient will result from its secondary occurrence in a product applied for a different nutrient. These steps are indicated by blocks 106, 108, 110 and 112 in FIG. 4A. Prioritization is repeated until each nutrient has been assigned a priority. This is indicated by block 114.

Next, the user selects a product for each corresponding nutrient. The user indicates which product (from, for example, a dealer-provided product list) the user wishes to base the analysis on for nitrogen, phosphorous, potassium and zinc. Each of these products will have a product make-up analysis (i.e., an indication of what fertilizer components are actually contained in the product and the amount of each). In the present example, Urea is selected for N, Diamonium Phosphate (DAP) is selected for $P_2O_5$, and Muriate of Potash is selected for $K_2O$.

Once each nutrient is assigned a priority, a representative value, indicative of a field wide requirement for the particular nutrient, is calculated by computer 54. In a preferred embodiment, this representative value is the median of all cells in the raster map for each nutrient. If the particular nutrient is to be excluded from the optimization analysis, then the median value assigned for that nutrient is zero. Calculation of the median value for each nutrient is indicated by blocks 116 and 118. While the mean value or other suitable value can be used, the median is preferred.

Computer 54 also calculates a correlation coefficient (r) for paired nutrient requirement layers, based on a chosen nutrient. The chosen (or principal) nutrient is determined based on the following, from the two nutrients receiving a high priority rating:

a) select the nutrient with the most complex product nutrient analysis; and b) if neither analysis is complex or if both are equally complex, choose the high priority nutrient with the largest median nutrient requirement value. In the present example, DAP has a more complex analysis and $P_2O_5$ is determined to be the principal nutrient.

Therefore, a correlation coefficient is chosen for each nutrient paired against the $P_2O_5$ nutrient. For a first approximation of the optimal blend, N, $K_2O$ and Zn are dependent variables and $P_2O_5$ is the independent variable. The total number of pairs generated during this coefficient correlation generation is equal to the total number of rows times the total number of columns in one raster layer. The coefficient pairs (r, ρ) are preferably generated according to the following two equations:

$$r_{x,y} = \rho_{x,y} = \frac{Cov(X,Y)}{\sigma_x \cdot \sigma_y} \quad \text{Equation 1}$$

where $-1 \leq \rho_{x,y} \leq 1$; and $$Cov(X,Y) = \frac{1}{n} \sum_{i=1}^{n} (x_i - \mu_x)(y_i - \mu_y) \quad \text{Equation 2}$$

where:

$r_{x,y}$=sample correlation coefficient between sample populations x and y;

$\rho_{x,y}$=theoretical correlation coefficient between populations x and y;

$\sigma_x$=standard deviation for population x;

$\sigma_y$=standard deviation for population y;

COV(X,Y)=Covariance between sample populations X, and Y;

n=number of array elements in raster map, or generally, the number of comparisons between sample populations x, and y;

$x_i$=sample value of the $i^{th}$ sample from sample population x;

$y_i$=sample value of the $i^{th}$ sample from sample population y;

$\mu_x$=estimated mean of population x;

$\mu_y$=estimated mean of population y.

This is indicated by blocks 120 and 122. Keeping in mind that, in the embodiments shown in FIGS. 4A–4H, the nutrient upon which the nutrient ratio determinations and analysis are based is $P_2O$, the median values calculated for each nutrient are next weighted. The weighting factor is based on the correlation factor. It has been observed that where r is less than 0.30, the correlation between layers diminishes to become random. Therefore, in that instance, the term $r^2=0.09$ is preferably used as the weighting factor.

Also, where r is greater than 0.80, it has been observed that r tends to overestimate the correlation between layers. Therefore, in that instance, the term $r^2=0.64$ is preferably used as a weighting factor. Where r is between 0.3 and 0.80, the corresponding value of $r^2$ is used as a weighting factor. The median values for each nutrient (other than the principal nutrient) are multiplied by the corresponding square of the correlation coefficient, r, and the result is rounded to a whole number. This is indicated by block 124.

Once the median value of each nutrient is multiplied by the square of its correlation coefficient, the result is a number of weighted median values. Each of these weighted median values is summed, and the sum is divided by each weighted median value to arrive at a corresponding target ratio value for each nutrient. This number is rounded to the nearest hundredth, and this is indicated by block 126.

Once the target ratios are calculated, computer 54 then retrieves the list of products from the product table. This list, as discussed above, typically includes a list of products along with a product make-up analysis (indicating the precise amount of fertilizer components contained in each product), relative densities in the product, and other information, such as product pricing. An example of such products would be urea: 46-0-0 (indicating the amount of nitrogen, phosphorous and potassium in the product); diammonium phosphate (DAP): 18-46-0; and muriate of potash: 0-0-60. The corresponding relative densities in each product are listed, approximately, or a range of common densities is provided. This is indicated by block 128.

Next, computer 54 performs the blend calculation. From the list of products accessed by computer 54, the preferred form of the fertilizers $P_2O_5$, N, and $K_2O$ are selected (i.e., the products are selected). In the preferred embodiment, computer 54 defaults to DAP: 18-46-0; urea-46-46-0; and potash-0-0-60. Computer 54 can choose the appropriate phosphorous product as the least expensive, the most agronomically appropriate, or the product can be manually selected by the user.

First, computer 54 calculates the $P_2O_5$, analysis for blend one. The target ratio for $P_2O_5$ is multiplied by the corresponding product make-up analysis listed in the product table for the phosphorous products (i.e., 46 for DAP).

Next, computer 54 calculates the N analysis for blend one. The amount of N contributed by the application of other products containing nitrogen as a secondary nutrient is first calculated (i.e., DAP contains 18% N and 46% $P_2O_5$). The target ratio for N is then multiplied by the corresponding N product make-up analysis (i.e., 46 for urea). If the contributed N is equal to or greater than the calculated N analysis value (i.e., if it is greater than the product of the target ratio multiplied of the product of the target ratio and the N-product make-up analysis), then the contributed N value is used as the N analysis for blend one and the amount of the product chosen to provide nitrogen in a fertilizer blend is defaulted to zero (i.e., the amount of contributed N meets the required amount).

If the contributed N is less than the calculated N analysis for blend one, then the contributed N is subtracted from the calculated N analysis value to determine the amount of N which must be contributed by the product chosen to provide N in blend one. From this information, computer 54 determines the appropriate amount of the product chosen to supply nitrogen in blend one.

This same analysis is performed for $K_2O$ and zinc. The calculations to determine the amount of fertilizer needed to provide adequate amounts of $P_2O_5$, N, $K_2O$ and Zn are shown by blocks 130, 132, 134, 136, 138, 140, 142, 144, 146, 148, 150, 152 and 154.

Computer 54 also preferably calculates the price and relative density of blend one. From the product table, computer 54 multiplies the resulting nutrient ratio by the corresponding price of selected product. This information is then provided to the user who can consider the price and tonnage required and make any desired changes to blend one.

As an example, assuming that the target ratio for N is 0.5, the target ratio for $P_2O_5$ is 0.4 and target ratio for $K_2O$ is 0.1 (and zinc is to be excluded from the optimization process), a resulting table is as follows:

TABLE 1

| | N | $P_2O_5$ | $K_2O$ | $ ton$^{-1}$ |
|---|---|---|---|---|
| Urea: | 16 | 0 | 0 | $87 |
| DAP: | 7 | 18 | 0 | $94 |
| Potash: | 0 | 0 | 6 | $14 |
| Sum: | 23 | 18 | 6 | $195 |
| Ratio | 0.5 | 0.4 | 0.1 | |

In the above table, the costs were determined as follows:
urea: 16/46*$250=$87 ton$^{-1}$ of blend
DAP: 18/46*$240=$94 ton$^{-1}$ of blend
Potash: 06/60*$135=$14 ton$^{-1}$ of blend
TOTAL: $195 ton$^{-1}$ of blend
This is indicated by block 156.

Once blend one has been calculated, an application coefficient for each raster relative to the $P_2O_5$, requirement map versus the $P_2O_5$, analysis layer is calculated. The $P_2O_5$ requirement value is divided by the $P_2O_5$, product make-up analysis in blend one (i.e., DAP-$P_2O_5$=46) for each raster of the map. This division yields a blend one coefficient (BLCOEFF) raster layer. This is indicated by blocks 158 and 160. Then, individual nutrient maps are created for each of the nutrients under analysis by multiplying the BiCOEFF by the corresponding nutrient analysis for each element.

The amount of each nutrient applied by blend one is then subtracted from the initial requirement provided by the initial requirement map. This results in a second (or supplemental) requirement map for each nutrient of interest. In the embodiment shown in FIGS. 4A–4H, the $P_2O_5$ requirement should be close to zero in the supplemental requirement map. If the raster value for a nutrient in the supplemental requirement map is less than zero, than the value in that particular raster is defaulted to zero. This is indicated by blocks 162 and 164.

Next, an over-application map is created for each nutrient. This map essentially highlights each raster on the map where the value is less than zero, and by what amount. This is indicated by block 166.

Computer 54 then generates a first approximation of an application rate map for blend one. The $P_2O_5$ requirement indication in each raster of the requirement map is divided by the $P_2O_5$ analysis ratio from blend one (i.e., DAP-$P_2O_5$= 0.46=46/100) to create a blend one rate map. This is indicated by blocks 168 and 170.

The blend one rate map is then multiplied by the blend price calculated above to yield a blend one cost map. The total cost for blend one can be obtained by summing the value in each raster of the blend one cost map. This is indicated by block 172. The computer 54 can also optionally generate a cost map for each nutrient applied, generate a cost map representing spacial distribution of costs by product, or any other suitable cost maps. This is indicated by block 174.

At this point, computer 54 has generated the optimal or desired blend of fertilizer components for blend one, as well as a rate map which indicates the fertilizer application rate at which blend one is to be applied to field 12. Next, computer 54 generates an optimization for a second blend of fertilizer, in the embodiment in which two blends are to be calculated. This is done in substantially the same fashion as blend one except that rather than using the initial nutrient requirement maps, the nutrient requirement maps used to calculate blend two are the supplemental requirement maps (i.e., the initial nutrient requirement maps, taking into account the effect of blend one). The global mean value for each nutrient (instead of the global median values) are preferably generated when optimizing blend two. In calculating the global mean value, the global mean for phosphorous should be very close to zero since $P_2O_5$ was optimized in blend one.

Using the supplemental nutrient requirement map, the correlation coefficient, r, for $K_2O$ versus N is calculated. The correlation coefficient for $P_2O_5$ is insignificant because blend one was based on $P_2O_5$. The weighting factor for blend two is based on r, rather than $r^2$. The $r^2$ used as a weighting factor gives a very conservative blend optimization so it is used in the primary blend (blend one). However, it is preferred that the weighting factor simply be the correlation coefficient r, when calculating the secondary blend (blend two).

The same lower and upper bounds of r (0.30 and 0.80) are used to optimize blend two. This is indicated by blocks 176, 178, 180, 182 and 184. The target ratios are then calculated in the same manner as illustrated above with respect to $P_2O_5$. This is indicated in block 186.

Computer 54 again accesses the product table and performs the blend two calculation by referring to the specific product make-up analyses for the products designated in the product table (i.e., urea-46-0-0; and potash-0-0-60). This is indicated in blocks 188 and 190.

Next, the N analysis is calculated for blend two in a similar fashion as was the $P_2O_5$ analysis calculated in blend one. This is indicated by blocks 192 and 194. Also, the amount of $K_2O$ applied in blend one and blend two is determined in the same fashion as it was in blend one. This is indicated by blocks 196, 198 and 200. It is then determined whether the amount of $K_2O$ contributed by other products is less than the $K_2O$ requirement. If so, the value contributed is subtracted from the requirement value. If not, a value of zero is placed in the appropriate raster as a default. This is indicated by blocks 202, 204 and 206. Finally, the resulting nutrient ratio for blend two is calculated. This is indicated by block 208.

It should also be noted that, in the preferred embodiment, computer 54 generates another raster map which indicates under applications of any of the nutrients. Further, a fourth raster map can be generated for each nutrient of interest representing blend precision. This is preferably generated by summing corresponding nutrients as applied using the optimized blends and subtracting from the original nutrient map. Other suitable raster maps can also be generated. Further, the price map, discussed with respect to blend one, is also preferably generated for blend two. This is indicated by block 210.

Next, computer 54 calculates the blend two rate map. This is done in a similar fashion to the blend one rate map and is illustrated in blocks 212, 214, 216, 218, 220 and 222. Then, the blend two rate map is multiplied by the blend price calculated to yield a blend two cost map. The sum of the blend one cost map and blend two cost map can also be generated by computer 54 to yield a total fertilizer cost map. Also, optionally, computer 54 can then generate an overall cost map for each nutrient applied. This is indicated by blocks 224, 226 and 228.

Figure 4H:
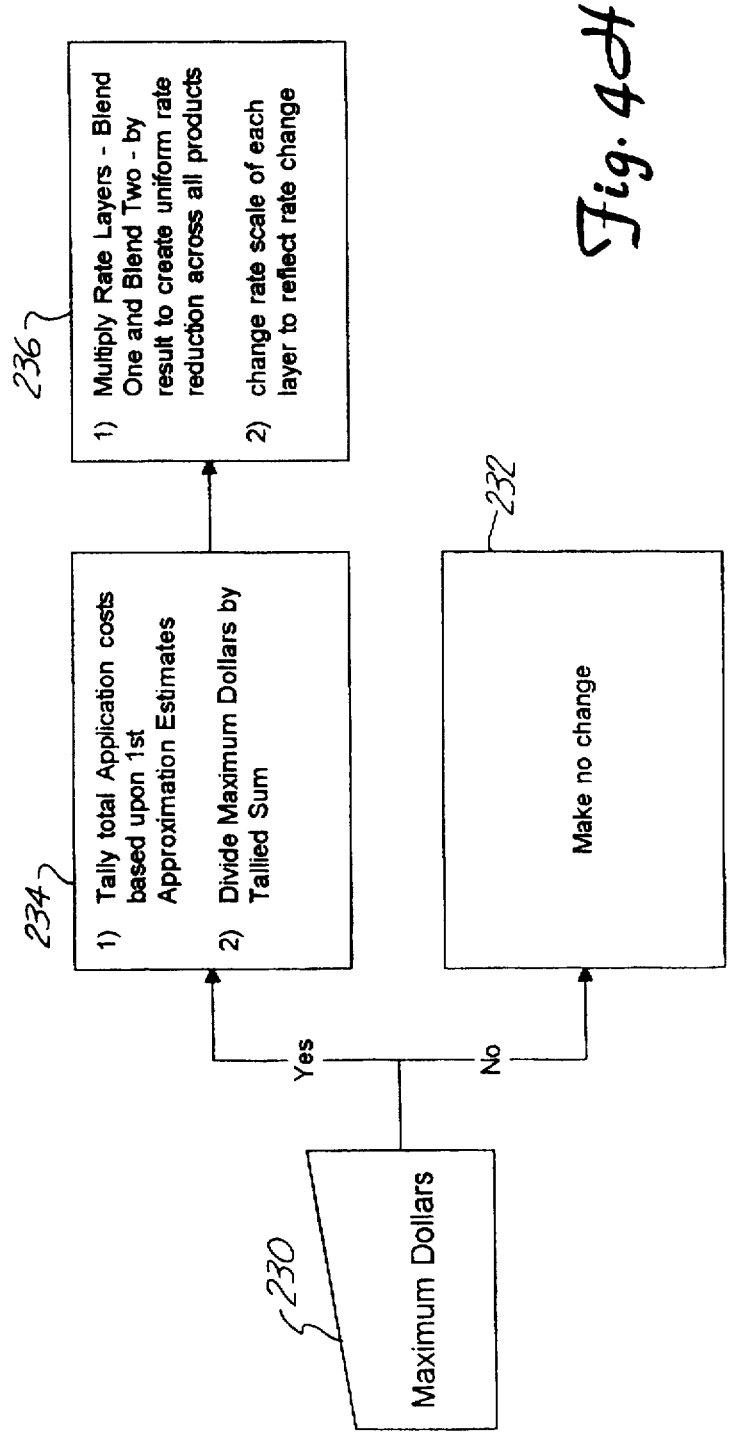

Also, FIG. 4H illustrates one optional manipulation which can be performed by computer 54. If the user has a maximum dollar amount available for the fertilizer application, that can also be input to computer 54. If the total cost for blends one and two is within that maximum dollar amount, computer 54 indicates that no changes are required. If not, the computer indicates that changes are required. This is indicated by blocks 230, 232 and 234. One method of making adjustment in the case in which the total cost exceeds the maximum dollars allowed, is to simply divide the maximum dollars by the total cost of blends one and two. Then, the application rate raster maps are multiplied by this ratio to create a uniform rate reduction of all products across the entire field. Alternatively, the operator can program computer 54 to preferentially change rates based upon the specific nutrient being applied. This is indicated in block 236.

Computer 54 also accesses map header information. This information typically includes the number of rows and columns in the raster map, the values that correspond to null portions of the field (i.e., portions of the field which do not grow crops because of intermittent streams, tree clumps, or other areas which are non-farmable), and an alternate coordinate system so that the vector and raster maps can overlay one another properly.

Figure 5A:
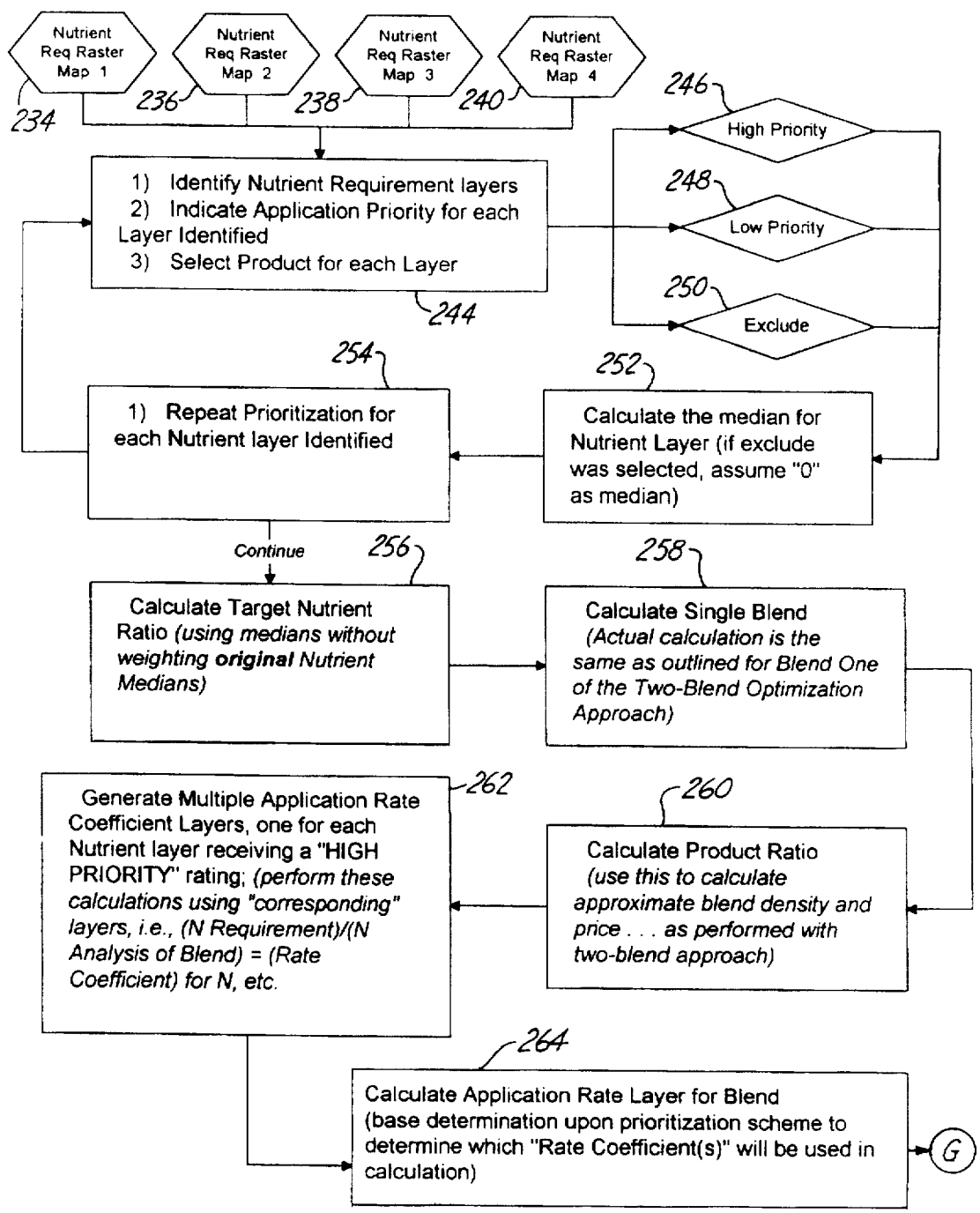
FIGS. 5A–5B are flow diagrams illustrating a second embodiment of the present invention.
Figure 5B:
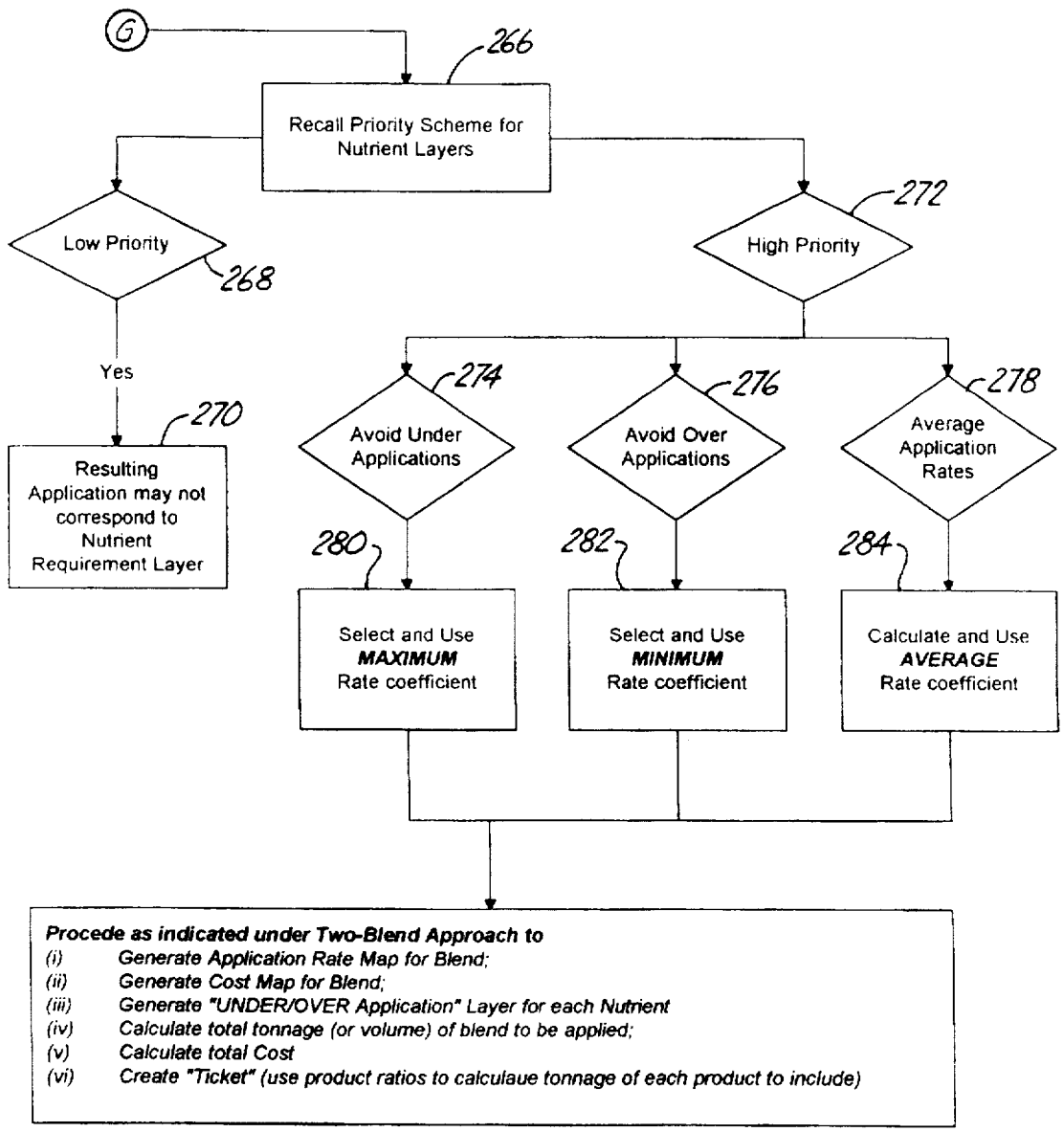

FIG. 5A illustrates operation of the system according to the present invention calculating only a single blend. A number of the blocks in FIG. 5A are similar to those in FIGS. 4A–4H. Initially, the nutrient raster maps are provided to computer 54 and the nutrients are ranked according to priority. The median value for each nutrient is calculated and the target ratios are also calculated. Next, the single blend is calculated which is the same as blend one in the two blend calculation set out in FIGS. 4A–4H. Next, the product ratio is calculated and used to approximate blend density and price. This is also performed in the same fashion as in the embodiment discussed with respect to FIGS. 4A–4H. Next, application rate coefficient raster maps (or layers) are generated for each nutrient having a high priority rating. All of these blocks have been discussed above with respect to the embodiments set out in FIGS. 4A–4H and are indicated by blocks 234–262 in FIG. 5A.

Finally, the application rate layer for the blend is determined based upon the prioritization scheme used to determine rate coefficients. The priority scheme for the nutrient layers is first recalled by computer 54. For low priority nutrients, the resulting application may not correspond to the nutrient requirement layer. This is indicated by blocks 264, 266, 268 and 270.

For the high priority nutrients, the user can specifically choose that under-applications should be avoided, over-applications should be avoided, or average applications should be used. If the user selects that under-application is to be avoided for a specific nutrient, then the maximum rate coefficient for that particular nutrient is used. This indicates that the applicator may over apply some nutrient, but will certainly not under apply the high priority nutrient under analysis. If over-applications are to be avoided, then computer 54 selects the minimum rate coefficient corresponding to the nutrient. This is usually selected if two applications during the year are applied. This indicates that the applicator will under apply at least one of the nutrients (if more than one of the nutrients receive high priority ranking). Computer 54 will then recalculate another raster map indicating where under-application has occurred.

If the average application rates are to be used, some nutrients may be over or under applied. However, this has been observed to work quite well especially if only one application is applied. These steps are indicated by blocks 272, 274, 276, 278, 280, 282 and 284.

Once computer 54 has undertaken these calculations, processing proceeds as with the two blend embodiments set out in FIGS. 4A–4H.

It can be seen that the present invention efficiently and quickly calculates blend optimization for fertilizer components to be applied to a field. The blend optimization is based on requirement maps which are input to the system in one of a variety of fashions. The present invention can be configured to calculate either a single optimized blend, or a plurality of (any suitable number of) optimized blends which can be varied across the field against one another to achieve an overall optimum application. The present system is also extremely flexible and versatile in that it can provide the user with any number of output maps (such as cost maps, tonnage maps, etc.) which can also be broken down by location in the field, by nutrient, or both. This allows the user to achieve extremely flexible and efficient results.

In addition, the present invention calculates a blend which can be blended by the fertilizer dealer. This substantially reduces or eliminates the cumbersome nature of previous field applications which required the user of the applicator to bring a large number of different fertilizer components into the field, and to make numerous refilling operations when a particular fertilizer bin was empty. Instead, with the present invention, only a single blend, or a plurality of blends are required to be brought into the field. Computer 54 indicates to the operator which bin each blend should be placed in for most efficient applications. This greatly reduces the inefficiencies associated with prior systems.

Although the present invention has been described with reference to preferred embodiments, workers skilled in the art will recognize that changes may be made in form and detail without departing from the spirit and scope of the invention.

What is claimed is:

1. A method of applying fertilizer to a field, comprising:

obtaining a nutrient requirement map for the field indicating nutrient requirements for a plurality of locations in the field;

calculating a first blend of fertilizer based on the nutrient requirements;

calculating a second blend based on the nutrient requirements and based on the first blend;

blending fertilizer components to form the first and second blends;

loading the first and second blends into corresponding first and second bins of an applicator; and simultaneously applying the first and second blends with the applicator at first and second application rates, wherein the application rates vary as the applicator travels across the field based on nutrient requirements corresponding to the location over which the applicator is then traveling.

2. The method of claim 1 wherein obtaining a nutrient requirement map comprises:

obtaining soil samples from a plurality of sample locations in the field;

identifying each soil sample with one of the plurality of sample locations; and analyzing the soil samples to determine the nutrient requirements for the field.

3. The method of claim 1 wherein calculating the second blend comprises:

obtaining a second nutrient requirements map for the field indicative of second nutrient requirements for the plurality of locations, taking into account application of the first blend.

4. The method of claim 1 wherein applying the second blend comprises:

loading the second blend into a second bin of the applicator; and applying the second blend, during application of the first blend, at a second application rate, wherein the second application rate varies as the applicator travels across the field based on second nutrient requirements corresponding to the location over which the applicator is then traveling, based on at least one of the fertilizer components in the first blend, and based on the first application rate.

5. The method of claim 4 and further comprising:

receiving applicator parameters indicative of bin sizes of the first and second bins; and determining which of the first and second blends is to be loaded into which of the first and second bins based on the bin sizes and based on blend volumes of the first and second blends.

6. The method of claim 5 wherein at least one of the first and second blends is calculated based on the bin sizes of the applicator.

7. The method of claim 1 and further comprising:

receiving product information indicative of a cost of the fertilizer components; and wherein at least one of the first and second blends is calculated based on the cost of the fertilizer components.

8. The method of claim 1 and further comprising:

receiving application boundary information indicative of an application range for the fertilizer components; and wherein at least one of the first and second blends is calculated based on the application boundary information.

9. The method of claim 1 and further comprising:

receiving priority information indicative of a priority assigned to the fertilizer components, the priority corresponding to a desired application level relative to the nutrient requirements; and calculating at least one of the first and second blends based on the priority information.

10. The method of claim 1 wherein obtaining a nutrient requirement map comprises:

obtaining field boundary information indicative of boundaries of the field, wherein the field boundary information is in the form of vector map information and wherein the nutrient requirements are in the form of raster map information.

11. A method of applying fertilizer to a field, comprising:

calculating a first fertilizer blend;

blending fertilizer components to obtain the first fertilizer blend;

applying the first fertilizer blend to the field at an application rate; and wherein calculating the first fertilizer blend comprises:

obtaining a nutrient requirement map for the field indicative of requirements of each of a plurality of nutrients at a plurality of locations in the field;

selecting a fertilizer product corresponding to each nutrient, each fertilizer product having a specified portion of nutrients in the fertilizer product;

assigning an application priority to each nutrient;

calculating a representative nutrient requirement for a chosen one of the nutrients and each of a remainder of the nutrients based on the nutrient requirement maps for the nutrients;

calculating a correlation coefficient indicative of a correlation between a chosen fertilizer product corresponding to the chosen nutrient and a remainder of the fertilizer products corresponding to the remainder of nutrients;

calculating a weighting factor for each of the remainder of the nutrients based on the correlation factor and the representative value for each of the remainder of the nutrients;

calculate a target ratio for each nutrient based on the weighting factor;

multiplying the target ratio of each nutrient by the specified portion of the nutrient in the corresponding fertilizer product to obtain a nutrient analysis for each nutrient;

determining an amount of each of the remainder of nutrients contributed by the fertilizer product corresponding to the chosen nutrient;

adjusting the nutrient analysis for each of the remainder of the nutrients based on the amount of each of the remainder of the nutrients contributed by the fertilizer product corresponding to the chosen nutrient;

calculating an amount of each fertilizer product to be blended in a first blend based on the nutrient analyses for the chosen nutrient and the nutrient requirements for the chosen nutrient; and calculating an application rate map for the first blend indicative of an application rate for the first blend at the plurality of locations in the field.

12. The method of claim 11 and further comprising:

calculating a second set of nutrient requirement maps based on the first nutrient requirement maps and the nutrients in the first blend.

13. The method of claim 12 and further comprising: calculating a second blend based on the second set of nutrient requirement maps.

14. The method of claim 13 and further comprising:

blending the second blend;

receiving applicator information indicative of bin size of bins on an applicator; and assigning the first and second blends to bins on the applicator based on the bin sizes.

15. The method of claim 11 wherein calculating a target ration comprises:

summing the weighting factors calculated for each nutrient; and dividing the weighting factor for each nutrient by the sum of all the weighting factors.

16. The method of claim 11 wherein calculating a weighting factor comprises:

multiplying the representative nutrient requirement by a square of the correlation factor.

17. The method of claim 11 and further comprising:

calculating a blend cost based on the first blend; and determining whether the blend cost meets a predetermined dollar threshold; and adjusting the first blend when the blend cost does not meet the dollar threshold.

18. The method of claim 16 wherein adjusting the first blend comprises one of:

changing application rate of the first blend at a plurality of locations in the field; and making nutrient specific changes to the first blend.

19. A method of applying fertilizer to a field, comprising:

calculating a plurality of fertilizer blends and an application rate for each of the plurality of fertilizer blends;

blending fertilizer components to obtain the plurality of fertilizer blends;

providing a fertilizer applicator having a plurality of bins, each bin having a bin size;

wherein at least one of the plurality of fertilizer blends is calculated based on the bin sizes and the application rates;

loading the plurality of fertilizer blends into the bins based on bin sizes; and applying the plurality of fertilizer blends to the field at the application rates.

20. A method of applying an agricultural input to a field, comprising:

obtaining input requirements for a plurality of locations in the field;

specifying a precision factor indicative of an allowable precision in matching agricultural input application to the input requirements;

calculating a first application blend based on the input requirements and based on the precision factor;

blending input components to form the first blend; and applying the first blend, with an applicator, to the field.

21. The method of claim 20 and further comprising:

calculating a second application blend based on the input requirements, taking into account the input components in the first blend and based on the precision factor;

blending input components to form the second blend; and wherein applying comprises simultaneously applying the first and second blends, with an applicator, to the field.

22. A method of applying fertilizer to a field, the method comprising:

obtaining nutrient requirements for a plurality of locations in the field;

calculating a first fertilizer blend to accommodate a first set of the nutrient requirements, within a tolerance range, based on the nutrient requirements and based on available fertilizer products;

calculating a second fertilizer blend to accommodate a second set of the nutrient requirements, within a tolerance range, based on the nutrient requirements taking into account application of the first fertilizer blend and based on available fertilizer products; and simultaneously applying the first and second fertilizer blends to the field with an applicator.

23. A method of applying fertilizer to a field, comprising:

obtaining nutrient requirements for a plurality of locations in a field;

assigning a priority to each of a plurality of the nutrient requirements;

calculating a first fertilizer blend to accommodate a first set of the nutrient requirements, within a tolerance range, based on the nutrient requirements, based on t he priority, and based on available fertilizer products;

calculating a second fertilizer blend to accommodate a second set of the nutrient requirements, within a tolerance range, based on the nutrient requirements taking into account application of the first fertilizer blend, based on the priority, and based on available fertilizer products; and simultaneously applying the first and second fertilizer blends to the field with an applicator.

24. A method of applying an agricultural input to a field, comprising:

obtaining input requirements for a plurality of locations in a field;

obtaining a list of available products corresponding to each of the input requirement, and a cost for each of the products;

iteratively calculating a first blend to accommodate a first set of the input requirements, within a tolerance range, based on the requirements, based on the available products, and based on the cost of the available products;

forming the first blend; and applying the first blend to the field with an applicator.

25. The method of claim 24 and further comprising:

iteratively calculating a second blend to accommodate a second set of the input requirements, within a tolerance range, based on the input requirements taking into account application of the first blend, based on the cost of the available products and based on the available products; and wherein applying comprises simultaneously applying the first and second blends.

26. A method of applying fertilizer to a field with an applicator having a plurality of bins, each bin having a bin size, comprising:

obtaining nutrient requirements for a plurality of locations in a field;

calculating a first fertilizer blend to accommodate a first set of the nutrient requirements, within a tolerance range, based on the nutrient requirements and based on available fertilizer products;

calculating a second fertilizer blend to accommodate a second set of the nutrient requirements, within a tolerance range, based on the nutrient requirements taking into account application of the first fertilizer blend, and based on available fertilizer products;

calculating a quantity of each of the first and second blends required for application to a first of the plurality of locations in the field;

loading the quantity of each of the first and second blends into a corresponding bin on the applicator; and simultaneously applying the first and second fertilizer blends to the first of the plurality of locations in the field with the applicator such that the entire quantity of each of the fertilizer blends is applied to the field and depleted from the corresponding bins approximately simultaneously.

27. A computer programmed to calculate fertilizer blends to be applied to a field, the computer programmed to perform the following steps:

obtain nutrient requirements for a plurality of locations in the field;

calculate a first fertilizer blend to accommodate a first set of the nutrient requirements, within a tolerance range, based on the nutrient requirements and based on available fertilizer products;

calculate a second fertilizer blend to accommodate a second set of the nutrient requirements, within a tolerance range, based on the nutrient requirements taking into account application of the first fertilizer blend and based on available fertilizer products; and providing an output indicative of the first and second fertilizer blends.

28. The method of claim 1 and further comprising:

calculating a third blend based on the nutrient requirements and based on the first and second blends;

loading the third blend into a third bin of the applicator; and applying the third blend simultaneously with the first and second blends.

29. The method of claim 1 wherein at least one of the first blend and the second blend comprises:

a single fertilizer product containing at least one of the nutrient requirements.

* * * * *